Oct. 30, 1951          G. E. CHANDLER          2,573,541
CIRCUIT FOR MEASURING VOLTAGE BY OSCILLOSCOPE
Filed July 23, 1946
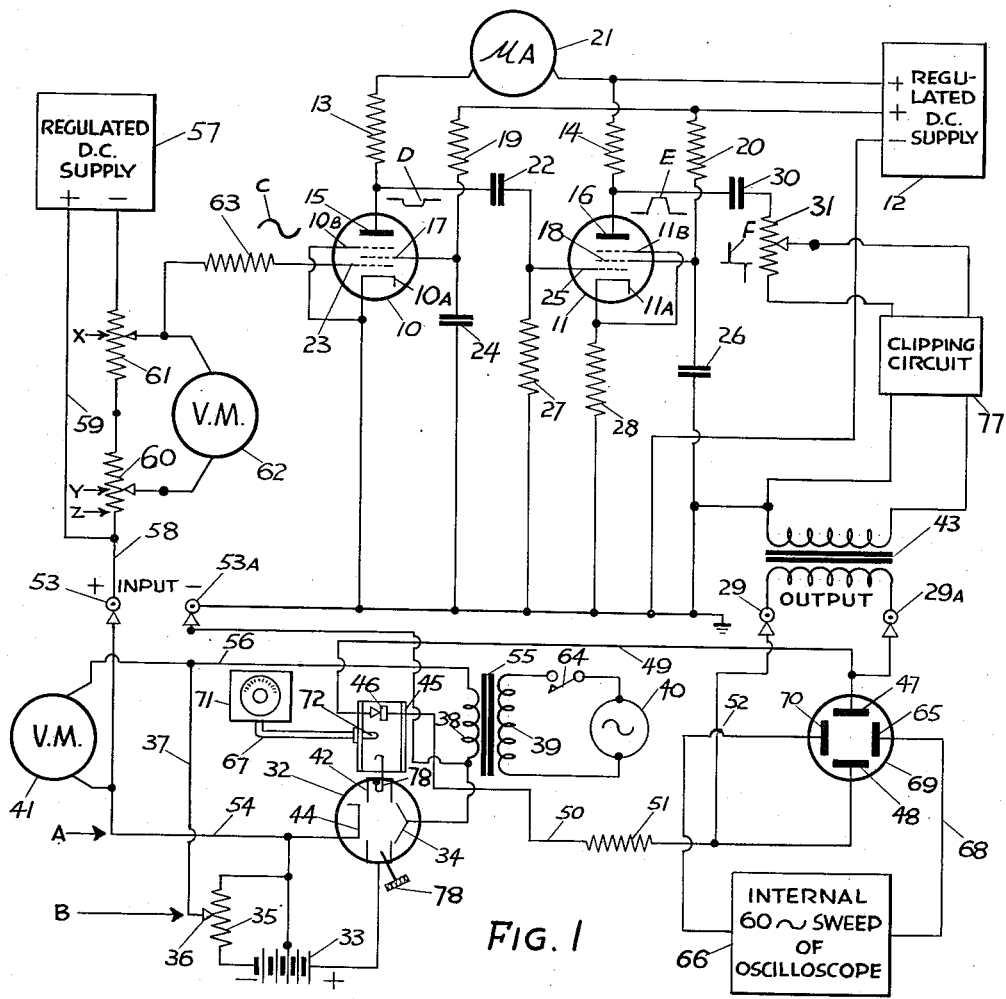
FIG. 1
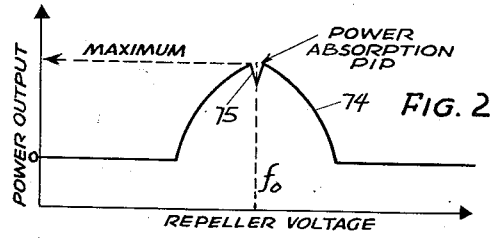
FIG. 2
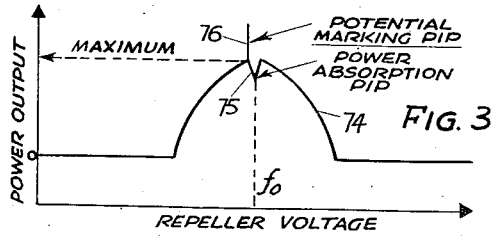
FIG. 3
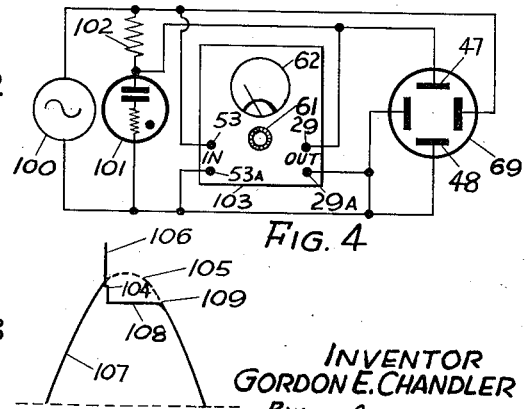
FIG. 4
FIG. 5
INVENTOR
GORDON E. CHANDLER
BY
ATTY.

Patented Oct. 30, 1951

2,573,541

UNITED STATES PATENT OFFICE 2,573,541

CIRCUIT FOR MEASURING VOLTAGE BY OSCILLOSCOPE

Gordon E. Chandler, Winchester, Mass., assignor to Raytheon Manufacturing Company, Newton, Mass., a corporation of Delaware Application July 23, 1946, Serial No. 685,587

5 Claims. (Cl. 315—4)

This invention relates to electrical circuits for the measurement of instantaneous values of varying voltages, and more particularly a varying voltage at a specified frequency.

The use of an oscilloscope to graphically indicate the occurrence of an instantaneous or recurring state under certain operating conditions in connection with electron-discharge devices and electrical circuits is well known. It is also well known to calibrate such graphic indicating devices to obtain a direct reading of the value of such recurring or instantaneous conditions. However, the necessity of altering the oscilloscope to accommodate the particular requirements of calibrating and the instability of the amplifiers used in such apparatus present disadvantages which frequently outweigh the usefulness of graphic indicators in connection with this type of electrical measurement.

It is, therefore, an object of the present invention to provide circuit means to be used in conjunction with any standard oscilloscope for the measurement of instantaneous values of varying voltages.

Another object is to provide a device of the type described to be used in conjunction with graphic indicating means for the analysis of waveforms.

Yet another object is to provide a device for the analysis of electron-discharge device characteristics.

The above and other objects will appear as the following description of the device of the present invention progresses, taken in conjunction with the accompanying drawing, in which:

Fig. 1 is a schematic representation of the device of the present invention in conjunction with the test of an electron-discharge tube;

Fig. 2 represents a power output trace of the power output of the electron-discharge tube as it would appear on the screen of an oscilloscope and indicates the absorption of some of the output power by a break or pip on said trace;

Fig. 3 is the same power output trace as shown in Fig. 2, but having superimposed thereon a second pip or peaked pulse to indicate the desired instantaneous varying voltage;

Fig. 4 is a schematic circuit showing the use of the device in connection with a test for a gas discharge device; and Fig. 5 illustrates the output trace present on an oscilloscope screen in connection with the circuit illustrated in Fig. 4.

Refer now more particularly to Fig. 1 which is a circuit diagram of apparatus embodying the present invention when used in connection with apparatus for investigating various parameters of velocity modulated vacuum tubes of the klystron type.

The apparatus of the present invention includes a high gain peaked pulse amplifier comprising an input vacuum tube 10 and an output vacuum tube 11. Both of the last-mentioned electron-discharge devices are known in the art as "sharp cutoff" type tubes such as, for example, a 6SJ7.

The aforementioned tubes 10 and 11 have, respectively, as their principal parts cathodes 10A, and 11A, suppressor grids 10B and 11B (said grids being connected to said cathodes), screen grids 17 and 18, and anode electrodes 15 and 16.

Cathode 10A and anode 15 are in series with load resistor 13, current indicating device 21, and a well-regulated power supply 12. Cathode 10A and screen grid 17 are in series with potential dropping resistor 19 and said regulated supply 12. Between screen grid 17 and cathode 10A is capacitor 24, said capacitor bypassing any alternating current in the screen grid circuit to ground.

The direct-current circuit of anode 16 includes anode 16, load resistor 14, regulated supply 12, cathode biasing resistor 28 and cathode 11A. The direct-current circuit for screen grid 18 includes said screen grid, resistor 20, regulated power supply 12, cathode biasing resistor 28 and cathode 11A. Capacitor 26 connected from screen grid 18 to ground serves to by-pass any alternating current components in this circuit.

Resistor 63 connected between potentiometer 61 and control grid 23 is used to limit the current in said control grid circuit to a safe value should an excessive positive potential be applied thereto.

Control grid 23 of tube 10 is normally biased to or beyond cutoff and the source of said biasing potential is derived from the algebraic difference between two sources of potential, namely 57 and 33. Input potential source 33 is partially shunted by potentiometer 35. The potential between point A and point B, or contact 36, is applied across the input terminals 53 and 53A. Source 57 is shunted by a pair of series connected potentiometers 60 and 61 and the potential drop between X and Z is in series with the potential applied across terminals 53 and 53A.

The polar relation of said sources of potential is such that said sources oppose or buck each other. Accordingly, the source 57 will be termed the bucking potential hereinafter.

The amount of bucking potential between points X and Z is adjusted by manipulating potentiometer 61 until the potential between these last-named points plus the potential between points A and B present an algebraic sum, in terms of potential, sufficient to bias tube 10 to cutoff or zero current as indicated on meter 21. For example, if the input potential between points A and B is 100 volts, the potential drop between points X and Z would have to be —103 volts, assuming that the —3 volts difference is the amount required to bias tube 10 to cutoff or zero plate current.

Now potentiometer 60 is manipulated until the potential drop between points X and Y equals the drop between the points A and B as indicated by voltmeters 62 and 41 The manipulation of potentiometers 60 and 61, as just outlined, is a calibrating procedure, and once the proper point on potentiometer 60 is found, it will not be necessary to adjust it again, unless the characteristics of tubes 10 and 11 change or regulated supply 12 is altered. In effect, this last-named setting of potentiometer 60 provides the potential drop between points Y and Z for biasing tube 10 to cutoff, provided the potential drop between points X and Y for the setting of potentiometer 60 is equal to the potential between points A and B.

Once the above calibration is made, any value of input potential between terminals 53 and 53A can be caused to be read on voltmeter 62 by properly manipulating potentiometer 61 until voltmeter 62 reads the same as voltmeter 41.

Thus far there has been described the means for deriving the proper bias potential to make tube 10 non-conducting. Referring now to the lower portion of the circuit there is shown a velocity-modulated tube 32 of the reflex klystron type. Said klystron tube 32 will be the device under observation in this particular embodiment. In this particular tube, repeller 34 is operated with a negative potential thereon, that is to say, the repeller is negative with respect to the cathode 44 of said tube. The amount of potential that is applied to the repeller electrode is determined by the manipulation of contact arm 36 of potentiometer 35. This last-named potential is supplied by battery 33 or some other source of direct current.

Interposed between repeller 34 and cathode 44 of tube 32 is the secondary 38 of transformer 55. Transformer 55 is energized from a 60-cycle source 40 when switch 64 is closed. The alternating current from said transformer is superimposed on the direct current in the repeller-cathode circuit of tube 32. For example, if the direct current potential between said repeller and cathode is 100 volts and the alternating current in the secondary 38 is of the order of twenty volts, the combined potential across the input 53 and 53A will sweep through a value between 80 and 120 volts.

As this combined direct and alternating potential, which is the repeller 34 or input potential, swings through this cycle of varying voltage, at some instant during said swing, the potential across input 53 and 53A will rise above the bucking potential between points X and Z and the bias potential on grid 23 of tube 10 will rise above cutoff and current will flow in tube 10.

Due to the characteristics of tube 10, a 6SJ7 type in this particular embodiment, said tube saturates rapidly at a very low input voltage. Inasmuch as the input potential appears as a sine waveform C to the control grid 23, the output potential at plate 15 will have a substantially square inverted waveform D. This form of output wave is due to the rapid saturation of tube 10, the current rise being rather limited and thus leveling or cutting off the positive peak of one-half of the original input sine wave C, the negative or lower half being eliminated by the rectifying action of tube 10.

Coupling of the output from plate 15 to control grid 25 of following tube 11 is through capacitor 22. Said capacitor and grid resistor 27 should have a time constant capable of passing the frequency of the input voltage under investigation. Tube 11 is biased, by means of the potential drop across cathode resistor 28, so that it functions as a class A amplifier in a manner known to those skilled in the art.

Since tube 11 functions as a class A amplifier, it will faithfully amplify the output of tube 10, in particular the rapid rate of change of voltage, until tube 11 itself cuts off or saturates, and will produce the amplified output of tube 10 in an inverted position as shown by reference latter E.

The output or alternating current path of plate 16 is from said plate through capacitor 30, variable resistor 31, through the primary of direct current isolating transformer 43, thence through cathode bias resistor 28 to cathode 11A. The time constant of capacitor 30 and resistor 31 should be small enough to provide a sharp-peaked waveform F across the resistor 31. Actually the circuit comprising capacitor 30 and resistor 31 is a differentiating circuit and the parameters which produce the particular output waveform F are well known to those skilled in the art.

Since, in this particular embodiment, it is desirable to have the positive peak applied to the vertical plates of oscilloscope 69, a clipping circuit 77, the parameters of which are well known to those skilled in the art, is inserted between the output across resistor 31 and the primary of transformer 43 to eliminate the lower or negative peak of waveform F.

Transformer 43 serves to isolate the direct current in the amplifier circuits from a crystal 46 circuit, to be described below, as both the output from said crystal circuit and output tube, via the transformer 43, are connected in parallel to the vertical deflection plates 47 and 48 of oscilloscope 69.

Referring now to that portion of the circuit involving the investigation of tube 32, with particular emphasis on the relation of repeller voltage at specified oscillation frequencies, there is illustrated a reflex klystron having a cathode 44, resonant cavity 42 and a repeller electrode 34. In the operation of such a device the repeller electrode has a potential thereon which is negative with respect to cathode 44 while cavity 42 is at a positive potential with respect to said cathode 44.

One of the characteristics of a reflex klystron is the fact that the frequency of such a device is a function of the repeller potential. Therefore, if the repeller potential is swept cyclically through a sufficient range and the output from cavity 42 is fed via loop 78 to a wave guide 45, the power output rectified by crystal 46 is impressed by means of lead 50 through resistor 51 on the vertical deflecting plates 47 and 48 of oscilloscope 69 and the trace observed thereon will be similar to 74 (illustrated in Fig. 2) but without pip 75.

Horizontal sweep is provided by the internal 60-cycle sweep circuit 66 of oscilloscope 69, circuit 66 being connected to the horizontal deflecting plates by means of leads 52 and 68. If desired the alternating component of the repeller potential derived from transformer 55 could be used instead by coupling through a suitable capacitor and amplifier to the horizontal deflecting plates 65 and 70.

Should it be desirable to show on trace 74 the coincidence of peak power output and resonant frequency, it is only necessary to place a pickup loop 72 within wave guide 45 and feed the energy thus picked up through coaxial cable 67 to absorption-type wavemeter 71, said wavemeter being set to the desired resonant frequency. If the pip 75, caused by the absorption of a portion of the output power, coincides with peak or maximum power output, the desired relation will be indicated as shown in Fig. 2, the pip occurring at maximum power output.

If the maximum power output does not coincide with the power absorption pip 75, it is only required to adjust the cavity 42 by manipulation of tuning plug 78 to change the volume of said cavity. This adjustment will cause trace 74 to shift with respect to the absorption pip 75 and the desired coincidence can be achieved.

The aforesaid description covers the means required to operate the amplifier and the means for graphically indicating on oscilloscope 69 a relationship between repeller potential and power output of a particular device under observation. In view of the fact that oscilloscope 69 is uncalibrated, the actual value of repeller potential is not indicated. Therefore, one of the features of the present device is to provide means for indicating said value of repeller potential without the necessity of calibrating oscilloscope 69. Such means are provided when the cyclically varying repeller potential is applied to the input terminals 53 and 53A.

As said cyclically varying potential sweeps through the selected range and the difference between this last-mentioned potential and the bucking potential reaches a value above cutoff for tube 10, tube 10 conducts in the manner hereinbefore described and a sharply-peaked pulse or pip is generated. This pulse or pip is applied to the vertical deflecting plates 47 and 48 and is superimposed on the power output trace 74 and appears as a rising mark or pip 76 as illustrated in Fig. 3.

Let it be assumed, for example, that the amplifier has been calibrated as described hereinbefore. It is desired to run a test on a number of klystrons of the type above described and a specification recites, as a requirement, that each tube shall be operable with an applied repeller potential of, for example, 150 volts at a predetermined resonant frequency. At this time there has also been set up the proper relationship of klystron parameters to graphically indicate, on oscilloscope 69, trace 74 with its power absorption pip 75 superimposed thereon.

Since the repeller potential desired is 150 volts, the range of repeller test voltage should have a maximum amplitude to exceed the bucking potential X—Z, adjusted to 150 volts. In other words, the input or repeller test potential, or combination of direct current potential between points A and B plus the alternating current from secondary 38, must have a range that will swing the sum of the test repeller potential and bucking voltage X—Z through cutoff of tube 10.

Potentiometer 61 is adjusted so that the reading on voltmeter 62 is the required repeller potential, for example, 150 volts. Now, with the input potential applied across the terminals 53 and 53A, as said input or repeller test voltage swings through the range hereinbefore described, and at the instant its algebraic sum with potential X—Z rises through cutoff of tube 10, a pip 76 will be generated that will appear superimposed upon trace 74, Fig. 3. If pip 76 coincides with pip 75, tube 32 will be considered as having met the requirements of the specifications, as set forth by way of example hereinbefore. If the pip 76 should appear displaced from pip 75, it is an indication that tube 32 is oscillating at an undesired repeller voltage, and the tube 32 would be rejected.

While this particular embodiment indicated the use of voltmeter 41 in connection with the calibration of the device, said device can be calibrated without voltmeter 41, by applying across terminals 53 and 53A any known input potential provided the value of said input potential did not exceed the maximum potential of source 57 less the biasing potential.

Once the device is calibrated it can be made to develop a signal voltage at the instant the cyclically varying input potential under observation reaches a certain value. As described hereinbefore in connection with the calibration of the device, the potential drop between points Y and Z is the bias potential necessary to maintain tube 10 non-conducting until the input potential reaches a value which exceeds the potential drop between X and Y. Manipulation of potentiometer 61 up or down increases or decreases the potential drop between points X and Y. If for example it is desired to investigate the value of a potential in relation to the occurrence of a particular graphic indication on an oscilloscope, it is only required to manipulate potentiometer 61 and pip 76 will be seen to move along trace 74, for example, until it coincides with pip 75. At coincidence of both pips, the reading on voltmeter 62 will be a true representation of said value of potential.

Fig. 4 is a block diagram of the device of the present invention in connection with a test circuit used to determine the firing potential of a gas-filled tube.

The 60-cycle alternating current line potential source 100 is applied across the gas tube 101 in series with an external current-limiting resistor 102. The voltage across tube 101 is applied across the vertical deflecting plates 47 and 48 of oscilloscope 69. Since the line potential 100 represents a low impedance without resistor 102 in the circuit, when tube 101 fires, no indication of the firing point would appear on the trace of oscilloscope 69. However, placing a resistor in series with tube 101 provides a voltage drop across said resistor 102 sufficient to cause an indication 104 of the firing potential to appear on the oscilloscope as shown in Fig. 5. Without resistor 102, the trace would appear as a sine wave 105.

As the input potential from source 100 across terminals 53 and 53A rises from minimum to maximum said potential will cause device 103 to generate a mark or pip at the output between terminals 29 and 29A, as described hereinbefore. Said output is impressed across the vertical deflecting plates 47 and 48 of oscilloscope 69 and will appear superimposed on trace 107 in Fig. 5 as a pip 106. Although this pip 106 is shown coincident with the firing point 104, it could have occurred any place on trace 107. However, manipulation of control 61 will bring it into coincidence with point 104 and the reading on voltmeter 62 would be a true representation of the instantaneous value of the firing potential. The nearly horizontal portion 108 of trace 107 is caused by the voltage regulating effect of tube 101 and the trace falls off at a point 109 when the decreasing input potential falls below the extinction potential and tube 101 ceases to conduct.

Therefore, the use of the device of the present invention obviates the necessity of calibrating an oscilloscope in terms of potential in order to determine at what value of potential a cyclically recurring phenomenon, graphically indicated on the screen of an oscilloscope, occurs. Further, regardless of changes in size, position, or phase of the trace, the reading on the voltmeter 62 will not be affected.

From the aforegoing examples it can be readily observed that the device of the present invention lends itself to a great variety of tests for determining the occurrence of electrical phenomenon at any instantaneous value of a varying voltage or current.

Therefore, many modifications will occur to those skilled in the art and it should be understood that such modifications do not represent a departure from the true spirit and scope of the present invention.

What is claimed is:

1. In combination, voltage-responsive graphic indicating means, means for generating a cyclically varying potential, connected to said graphic means for producing a predetermined graph thereon, means fed by and responsive to said varying potential for generating a marker potential at a predetermined point in the cycle of said varying potential, said marker generating means being connected to said indicating means to superimpose said marker potential on said graph, means for adjusting said marker potential generating means to vary the relative position of said point, and measuring means connected to said marker generating means for indicating the value of said varying potential at the adjusted position of said point.

2. In combination, means for graphically indicating the cyclically recurring electrical output of a device under test, means for generating a sharply peaked pulse in response to a predetermined cyclically varying input voltage, said generating means having input and output connections, the output of said device and the output of said generating means being connected to said indicating means, an adjustable circuit in the input connection of said generating means for adjusting said generating means to vary the predetermined input voltage at which said peaked pulse is generated, whereby said peaked pulse causes a graphical indication which may be made to coincide with a selected portion of the indication on said indicating means, and means connected to said generating means and responsive thereto for measuring the instantaneous value of said input voltage at the adjusted position of said adjusting means.

3. In combination, an oscilloscope, means for generating a periodically varying potential, said potential being applied to said oscilloscope to form a graphic representation on the screen thereof, a peaked pulse amplifier connected to said generating means having input and output connecting means and being responsive to a predetermined voltage magnitude of said potential when impressed on said input for producing a peaked voltage pulse at the output thereof, the output of said amplifier being connected to said oscilloscope, said output being superimposed upon said graphic representation to graphically indicate the relation between said predetermined magnitude and the whole of said varying potential, and means fed by said potential for measuring the value of said predetermined magnitude.

4. In combination, an amplifier having input and output connecting means, said amplifier being responsive to a periodically varying test potential applied to the input thereof, means for varying the value of the input test potential, the output of said amplifier being connected to means for graphically indicating the adjusted value of said test potential, and a measuring device connected to said amplifier for indicating the value of said test potential required to bring about said graphic indication.

5. In combination, means for determining a characteristic of an electron discharge device comprising a klystron having a frequency-determining circuit and a repeller electrode, a source of varying unidirectional voltage connected to said repeller to frequency-modulate said klystron above and below a predetermined desired resonant frequency, rectifying means connected to the output of said klystron, an indicator connected to said rectifying means for graphically indicating said last-named output, means connected to said klystron for altering said last-named output to obtain a graphic indication of the occurrence of said predetermined resonant frequency in the modulated klystron output, and means connected to and controlled by said voltage for generating a peaked pulse on said graphic indication when the instantaneous value of alternating voltage plus direct voltage impressed on said repeller equals the voltage desired on said repeller for said predetermined resonant frequency.

GORDON E. CHANDLER.

REFERENCES CITED

The following references are of record in the file of this patent:

UNITED STATES PATENTS

| Number | Name | Date |
| --- | --- | --- |
| 2,378,857 | Mayle | June 19, 1945 |
| 2,412,231 | Sharkey | Dec. 10, 1946 |
| 2,434,264 | Edson | Jan. 13, 1948 |
| 2,496,970 | Wertz | Feb. 7, 1950 |

OTHER REFERENCES

Theory and Applications of Electron Tubes, by H. J. Reich, 2nd. ed., 1944, McGraw-Hill Book Co., QC 544.V3R4.